United States Patent
Trauschein et al.

(10) Patent No.: US 11,194,102 B2
(45) Date of Patent: Dec. 7, 2021

(54) OPTICAL CONNECTOR ASSEMBLY COMPRISING A SHUTTER

(71) Applicant: HUBER+SUHNER AG, Herisau (CH)

(72) Inventors: Liebmer Trauschein, Thayingen (CH); Philipp Koffel, Schaffhausen (CH); Dominik Tibolla, Mörschwil (CH)

(73) Assignee: HUBER+SUHNER AG, Herisau (CH)

( * ) Notice: Subject to any disclaimer, the term of this patent is extended or adjusted under 35 U.S.C. 154(b) by 0 days.

(21) Appl. No.: 16/630,167

(22) PCT Filed: Jul. 11, 2018

(86) PCT No.: PCT/EP2018/068831
§ 371 (c)(1),
(2) Date: Jan. 10, 2020

(87) PCT Pub. No.: WO2019/012006
PCT Pub. Date: Jan. 17, 2019

(65) Prior Publication Data
US 2020/0355874 A1    Nov. 12, 2020

(30) Foreign Application Priority Data
Jul. 14, 2017   (CH) .................................... 00923/17

(51) Int. Cl.
*G02B 6/38*    (2006.01)

(52) U.S. Cl.
CPC ......... *G02B 6/3849* (2013.01); *G02B 6/3821* (2013.01); *G02B 6/3825* (2013.01); *G02B 6/3893* (2013.01); *G02B 6/3897* (2013.01)

(58) Field of Classification Search
CPC .. G02B 6/3849; G02B 6/3821; G02B 6/3893; G02B 6/3825; G02B 6/3897
(Continued)

(56) References Cited

U.S. PATENT DOCUMENTS

| | | | | |
|---|---|---|---|---|
| 5,708,745 A | * | 1/1998 | Yamaji | G02B 6/3849 372/33 |
| 5,909,526 A | * | 6/1999 | Roth | G02B 6/3825 385/78 |

(Continued)

FOREIGN PATENT DOCUMENTS

| | | |
|---|---|---|
| JP | 2010-224021 A | 10/2010 |
| WO | WO 2018/130338 A1 | 7/2018 |

OTHER PUBLICATIONS

EPO (Riswijk, NL), English language version of the International Search Report, Form PCT/ISA/210, for International Application PCT/EP2018/068831, dated Jul. 11, 2018 (5 pages).

*Primary Examiner* — Kaveh C Kianni
(74) *Attorney, Agent, or Firm* — Pauley Erickson & Swanson

(57) ABSTRACT

The invention is directed to a connector assembly (1) comprising a first connector part (2) which is interconnectable to a second connector part (3). The first connector part (2) comprises a ferrule (13) which is encompassed by a shutter frame (17) and a thereto attached shutter (16). The shutter (16) is arranged movable with respect to the ferrule (13) in a first direction (x) between a closed position, in which the shutter (16) encompasses a connection face (37) of the ferrule (13), and an open position, in which the connection face (37) is set free from the shutter (16). The shutter frame (17) and/or the shutter (16) comprises at least one locating surface (36) which during mating interacts with the second connector part (3) such that the shutter (16) is displaced relative to the ferrule (13) from the closed to the open position.

15 Claims, 3 Drawing Sheets

(58) Field of Classification Search
USPC .......................................................... 385/78
See application file for complete search history.

(56) References Cited

U.S. PATENT DOCUMENTS

| | | | | |
|---|---|---|---|---|
| 6,039,585 | A * | 3/2000 | Kim | H01R 13/5219 |
| | | | | 385/139 |
| 6,079,881 | A * | 6/2000 | Roth | G02B 6/3825 |
| | | | | 385/139 |
| 6,461,053 | B1 * | 10/2002 | Mayercik | G02B 6/3825 |
| | | | | 385/56 |
| 6,793,399 | B1 * | 9/2004 | Nguyen | G01M 11/088 |
| | | | | 356/241.1 |
| 6,811,318 | B1 * | 11/2004 | Hollis | G02B 6/3849 |
| | | | | 385/53 |
| 7,661,887 | B2 * | 2/2010 | Nakagawa | G02B 6/4296 |
| | | | | 385/70 |
| 2003/0210870 | A1 * | 11/2003 | Graves | H04Q 11/0005 |
| | | | | 385/71 |
| 2004/0052472 | A1 | 3/2004 | Roth et al. | |
| 2004/0179787 | A1 * | 9/2004 | Glazowski | G02B 6/3878 |
| | | | | 385/76 |
| 2004/0223701 | A1 * | 11/2004 | Tanaka | G02B 6/3897 |
| | | | | 385/55 |
| 2006/0153503 | A1 * | 7/2006 | Suzuki | G02B 6/3893 |
| | | | | 385/53 |
| 2008/0247709 | A1 * | 10/2008 | Eguchi | G02B 6/3849 |
| | | | | 385/60 |
| 2010/0054665 | A1 * | 3/2010 | Jones | G02B 6/3825 |
| | | | | 385/59 |
| 2010/0284655 | A1 * | 11/2010 | Nakano | G02B 6/387 |
| | | | | 385/78 |
| 2011/0206325 | A1 * | 8/2011 | Hioki | G02B 6/3849 |
| | | | | 385/76 |
| 2013/0315539 | A1 * | 11/2013 | Koreeda | G02B 6/3849 |
| | | | | 385/69 |
| 2014/0126874 | A1 * | 5/2014 | Hioki | G02B 6/3849 |
| | | | | 385/139 |
| 2014/0205239 | A1 * | 7/2014 | Sato | G02B 6/3893 |
| | | | | 385/55 |
| 2014/0219624 | A1 * | 8/2014 | Miller | G02B 6/387 |
| | | | | 385/139 |
| 2014/0334779 | A1 | 11/2014 | Megason et al. | |
| 2015/0055928 | A1 * | 2/2015 | Yoshizaki | G02B 6/3849 |
| | | | | 385/139 |
| 2015/0078710 | A1 * | 3/2015 | Sato | G02B 6/3849 |
| | | | | 385/78 |
| 2015/0362681 | A1 * | 12/2015 | Watte | G02B 6/3841 |
| | | | | 385/58 |
| 2015/0378109 | A1 * | 12/2015 | Samal | G02B 6/3849 |
| | | | | 385/58 |
| 2016/0018604 | A1 * | 1/2016 | Gurreri | G02B 6/3882 |
| | | | | 385/58 |
| 2016/0195681 | A1 * | 7/2016 | Leigh | G02B 6/3893 |
| | | | | 385/60 |
| 2016/0216456 | A1 * | 7/2016 | Leigh | G02B 6/4296 |
| 2017/0184798 | A1 * | 6/2017 | Coenegracht | G02B 6/3849 |
| 2017/0248762 | A1 * | 8/2017 | Sato | G02B 6/3897 |
| 2019/0146160 | A1 * | 5/2019 | Kadar-Kallen | G02B 6/3809 |
| | | | | 385/77 |
| 2019/0346627 | A1 * | 11/2019 | Zimmel | G02B 6/3809 |
| 2020/0132957 | A1 * | 4/2020 | Beri | G02B 6/4471 |
| 2020/0183092 | A1 * | 6/2020 | Gadmer | G02B 6/381 |

* cited by examiner

OPTICAL CONNECTOR ASSEMBLY COMPRISING A SHUTTER

BACKGROUND OF THE INVENTION

Field of the Invention

The present invention relates to a connector assembly comprising a shutter to prevent pollution, especially during interconnection of a first and a second connector part.

Discussion of Related Art

US 2014219624 A was first published in 2014 in the name of Xyratex Tech Ltd. and is directed to an optical connector for coupling with a complementary optical connector and for supporting an optical component. The connector comprises a cover moveable between a first and second position. The cover may also comprise a moveable shield and biasing components. Furthermore an optical connector assembly comprising covers that sequentially open is provided.

US 2013315539 A was first published in 2013 in the name of Japan Aviation Electron. It provides an optical connector whose miniaturization is easier than conventional. The optical connector comprises a housing holding an optical member, a slider slidably held by the housing, a shutter provided to the slider adapted to be opened and closed to expose and isolate the optical member. Furthermore coil springs are foreseen to push the slider in a direction away from the housing. The slider-side coil springs are disposed in a width direction of the shutter. The shutter is closed when the slider is moved by an elastic force of the slider-side coil springs away from the housing. The shutter is opened when the slider is moved against the elastic force of the slider-side coil springs in a direction approaching the housing.

JP 2010224021 A was first published in 2010 in the name of Mitsubishi Cable Ind. Ltd. A connector with a shutter plate is provided which prevents dust entering inside the connector. The backward motion of an outer case is restricted by abutting a leaf spring member to an abutting spring when the optical connector plug is not connected to a counterpart plug. A slider part is moved backward and the shutter plate fixed on the slider part is pulled up to release the abutting of the leaf spring. When the optical connector plug is connected to the counterpart plug, the outer case and the slider part are moved backward to project a ferrule toward the counterpart plug.

US 2008247709 A was first published in 2008 in the name of Honda Tsushin Kogyo Co. Ltd. It describes an optical connector which comprises a shading member. The shading member includes a shutter housing enclosing a plug frame slidably on an outside thereof and inserted into an engagement opening of a connector receptacle to be engaged when the shading member-equipped optical connector is connected. A shutter is supported by the shutter housing at a front part of the housing. It closes so as to shade the optical fibers at a position in front of the ferrule. An elastic member is disposed between the plug frame and the shutter housing that urges said shutter housing forward.

U.S. Pat. No. 6,039,585 A was first published in 1998 in the name of Reynolds Ind. Inc. It is directed to a connector assembly to join two contacts that have a seal assembly 5 comprised of replaceable and inexpensive components. The connector assembly has a female housing that automatically seals a contact when the connector assembly is not assembled. A male housing includes a rigid projection and a longitudinal passageway sized to mount a first contact therein. The seal assembly includes a resilient sleeve and the spring. During a connection process, a projection on the male housing portion forces the spring to release its engagement with the resilient sleeve so that the sleeve can deform and open into its normal position.

U.S. Pat. No. 5,708,745 A was first published in 1996 in the name of Fujitsu Ltd. It is directed to a device for preventing laser beam leakage. When an external connector has been removed from an optical transmission apparatus, a pair of movable shield plates are constantly urged in respective directions for closing a receiving opening of the apparatus to bring joining portions of the movable shield plates into close contact with each other, thereby preventing dust from entering the inside of the apparatus and the laser beam from being leaked.

The connector assemblies comprising a shutter as known from the prior art have a complex design, are difficult to operate and normally require a male and a female part which makes it even more complex. It is an object of the invention to provide a less complex connector assembly comprising a shutter which is easy and reliable to operate and which allows to arrange several connector assemblies in a dense manner and to prevent negative pollution of them.

SUMMARY OF THE INVENTION

In a preferred variation, a connector assembly according to the invention comprises a first connector part, which is interconnectable to a second connector part. The first connector part comprises at least one ferrule, which is encompassed directly or indirectly by a shutter frame and a thereto attached shutter which together form part of a shutter assembly. If appropriate, the ferrule can be held by a housing, which holds the shutter frame. In a preferred variation the shutter is arranged moveable with respect to the housing holding the ferrule. The ferrule can be arranged in the housing rigid or in a floating manner. If appropriate the shutter frame can be arranged at a certain distance with respect to the ferrule. It can be held by the housing which encompasses the ferrule.

The shutter assembly, comprising the shutter frame and at least one resilient sheet, is arranged movable with respect to the ferrule in a first direction between a closed position, in which the at least one resilient sheet of the shutter encompasses and protects a connection face of the ferrule from outside influences, and an open position, in which the connection face is set free from the at least one resilient sheet of the shutter. In the open position the connection face of the ferrule is ready for connection with a corresponding connection face of the second connector part.

The first direction corresponds normally to the mating direction of the first and the second connector parts.

In a simple design, the shutter frame and/or the shutter comprises at least one locating surface, which during mating interacts with the second connector part and/or an external support, such that the shutter assembly is displaced relative to the ferrule from a closed to an open position. The ferrule normally terminates at least one optical fiber. Depending on the field of application other type of connectors can be protected by the shutter arrangement as described herein.

In a variation, the shutter assembly comprises at least one resilient sheet, which is attached directly or indirectly to the shutter frame. The at least one resilient sheet extends in the closed position in a curved manner in front of a connection face of the ferrule. When displaced in a reward direction with respect to the ferrule, the ferrule presses on the inside of the at least one resilient sheet and thereby deforms it in a resilient manner in an outward direction such that the connection face of the ferrule becomes apparent. In an open position the at least one resilient sheet and the ferrule can be designed such that the resilient sheet rest on an outside wall of the ferrule without exerting force in the first direction (force neutral). In a preferred variation, the shutter assembly comprises two resilient sheets attached to the shutter frame, which encompasses the ferrule. The resilient sheets are arrange opposite to each other in a pointed arch like manner around the front of the ferrule which carries the connection face. During opening of the shutter the ferrule and/or a thereto adjacent part acts as a wedge forcing from the inside the at least one resilient sheet away. When the resilient sheet has a curved design with a variable inclination, the force necessary to open the shutter can be adjusted. In a preferred variation the inclination becomes less against the rear end of the resilient sheet, i.e. the area where the resilient sheet is attached to the shutter frame. If appropriate at least one resilient sheet can be replaced by a hinged flap rotating around a hinge with respect to the shutter frame. The hinge is preferably arranged along a rear edge of the flap. The flap can be moved between a closed and an open position similar to the resilient sheet as described hereinafter. If appropriate the flap can be spring loaded to assure proper alignment at least in the closed position.

The resilient sheet of the shutter is preferably made from thin resilient sheet metal, such as spring steel or the like. Good results can be achieved when the sheet metal has a thickness in the range of 0.05 mm to 0.2 mm. Depending on the size of the connector and its purpose of application, other dimensions may be appropriate. Alternatively or in addition, the resilient sheet can be made from a plastic material. Good results can be achieved by a symmetric balanced setup wherein the shutter comprises two resilient sheets which are arranged opposite to each other and which in a closed position interact with each other along a sealing edge. The resilient sheets are arranged in a prestressed manner, such that the firmly press against each other and thereby protect the ferrule arranged between them from unwanted outside influences. To assure that the shutter can be closed again, the shutter frame and/or the shutter can be arranged displaceable with respect to the ferrule in the first direction against the force of a spring. The shutter frame may comprises at least one rim extending along a side edge of shutter. The rim is arranged preferably close to the shutter leaving only a small gap, which does not significantly change during operation of the shutter. In a preferred variation, the rim merges into a locating surface, which is used to operate the shutter via the shutter frame as described hereinafter in more detail. The number of different parts can be reduced when the shutter frame comprises an upper and a lower part which have a symmetric design. The second connector part may also comprise a shutter and a shutter frame similar to the first connector part. To operate the shutter during interconnection at least one of the connectors parts may comprise an inner housing to which a ferrule is interconnected and which during mating with the second connector part is arranged translatable in the first direction with respect to the outer housing.

The shutter assembly as described herein offers the advantage, that the optical ferrules and interfaces can be protected effectively against contamination (e.g. dust particles etc.), furthermore laser radiation can be prevented as the ferrules are never exposed to the outside. Furthermore physical damage of optical interfaces can be effectively prevented. The shutter system as described herein can be used or added independently to connectors and ferrules etc. as modular element. A further advantage can be seen in the fact that the shutter design minimizes airflow during connection/disconnection and does not expand (i.e. increase of volume) the inner volume of the protected area. In addition the shutter function helps to avoid dust transport from outside to the inside area of the connector assembly during opening and closing (connection/disconnection). The shutter assembly can be designed as self-closing mechanism of shutter (i.e., shutter is always closed if disconnected).

A further advantage is that the shutter can be designed with low connection force which does not interfere with the overall connection/disconnection force of the assembly. If appropriate the shutter can be designed such that it offers shielding against electromagnetic fields (i.e., through conductive and antistatic shutter assembly, grounding). Alternatively or in addition the shutter and/or the shutter frame when made from and/or coated by conductive material can be used for transmission of electrical signals and/or power transmission and/or signals for control and indication, etc. Furthermore, the conductive parts can be electrostatically charged to obtain a dust repellant effect. As mentioned above, the shutters in a connection assembly can be designed symmetrical, such that no male/female configuration is necessary. In addition the shutter design supports high packing density and the shutter design is robust and cost efficient as it relies only on few parts. If appropriate a sealing means can be arranged in the area of the locating surface, which during interaction of the first and the second connector parts seals the ferrules foreseen to interact of the first and the second connector part with respect to the environment. Preferably the sealing means engages before the shutter releases the ferrule which it encompasses.

It is to be understood that both the foregoing general description and the following detailed description present embodiments and are intended to provide an overview or framework for understanding the nature and character of the disclosure. The accompanying drawings are included to provide a further understanding and are incorporated into and constitute a part of this specification. The drawings illustrate various embodiments, and together with the description serve to explain the principles and operation of the concepts disclosed.

BRIEF DESCRIPTION OF SEVERAL VIEWS OF THE DRAWINGS

The herein described invention will be more fully understood from the detailed description given herein below and the accompanying drawings which should not be considered limiting to the invention described in the appended claims. The drawings are showing:

DETAILED DESCRIPTION OF THE INVENTION

Reference will now be made in detail to certain embodiments, examples of which are illustrated in the accompanying drawings, in which some, but not all features are shown. Indeed, embodiments disclosed herein may be embodied in many different forms and should not be construed as limited to the embodiments set forth herein; rather, these embodiments are provided so that this disclosure will satisfy applicable legal requirements. Whenever possible, like reference numbers will be used to refer to like components or parts.

Figure 1:
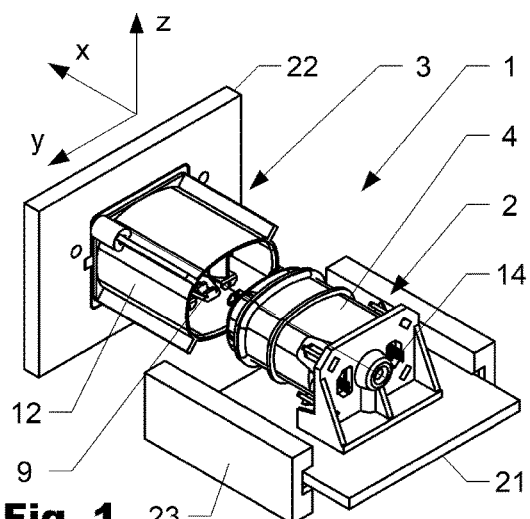
FIG. 1 shows a first embodiment of a connector assembly in a perspective manner from above and right.
Figure 2:
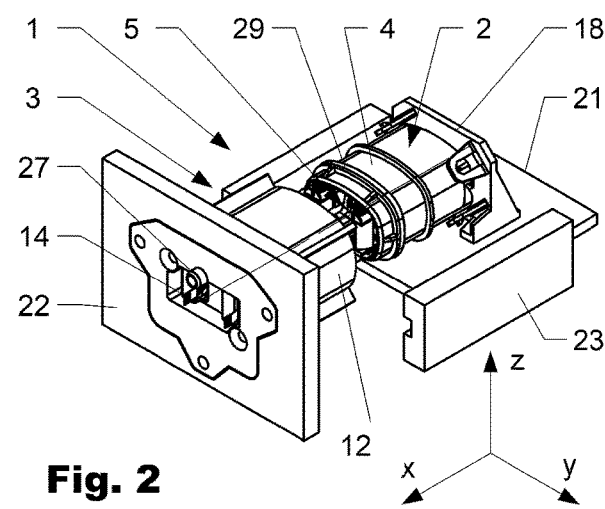
FIG. 2 shows the connector assembly according to FIG. 1 in a perspective manner from above and left.
Figure 3:
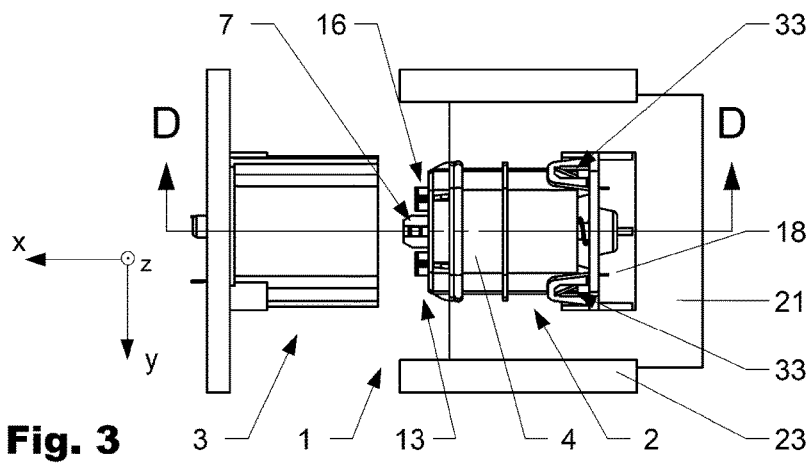
FIG. 3 shows the connector assembly according FIG. 1 in a top view in unmated position.
Figure 4:
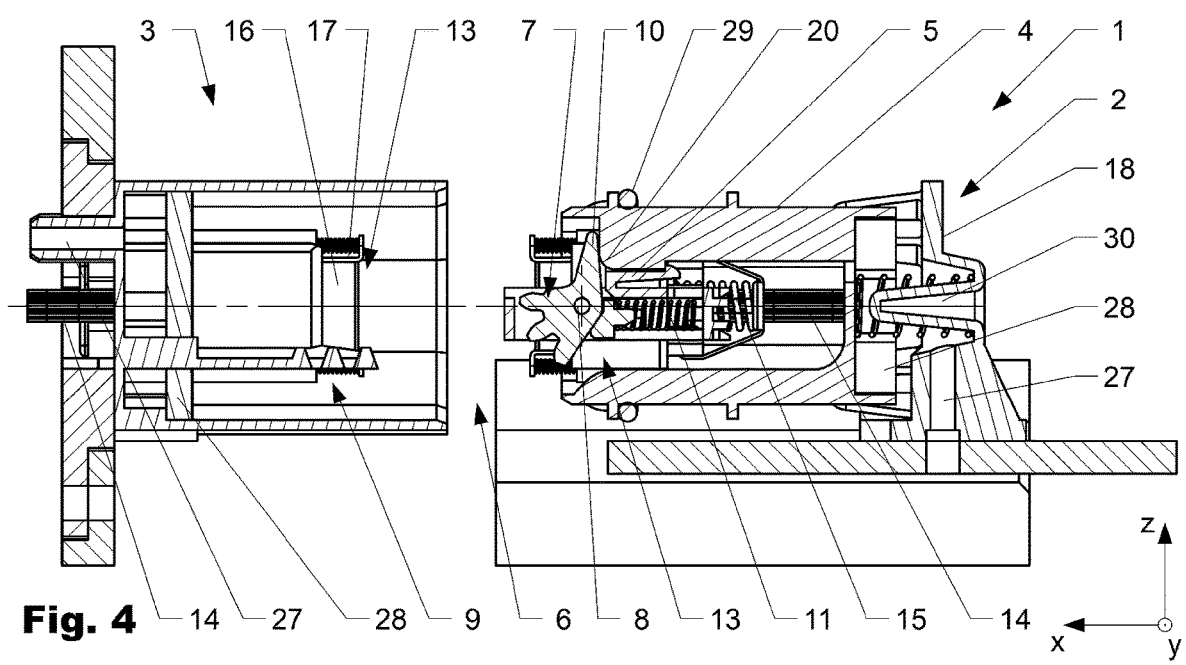
FIG. 4 is a section view along section line DD according to FIG. 3.
Figure 5:
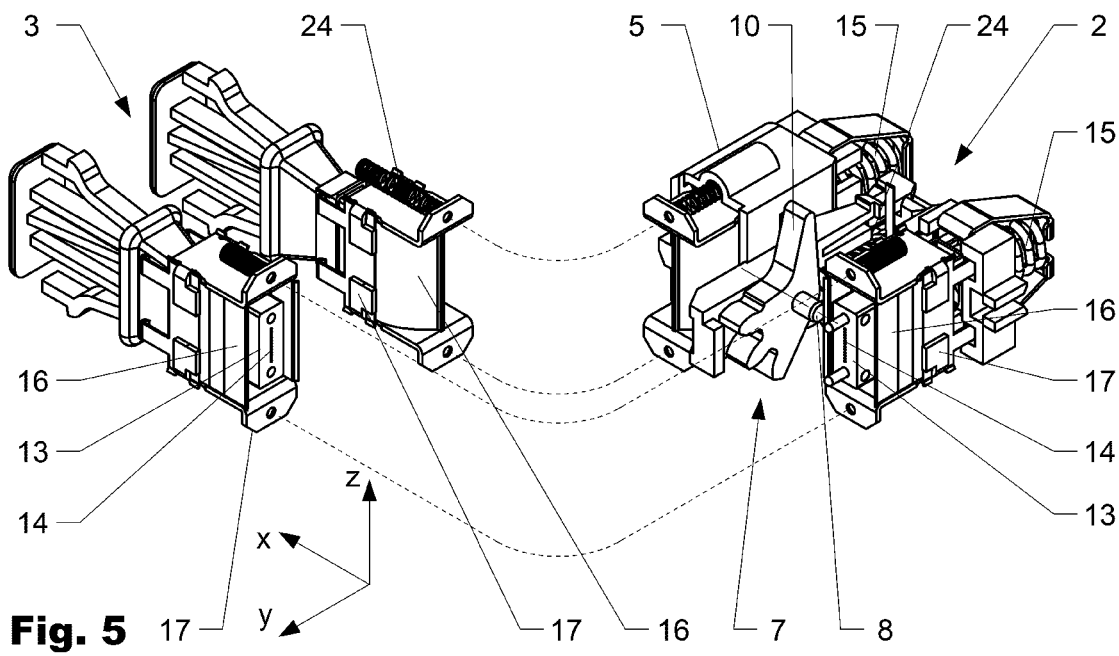
FIG. 5 is an arrangement of ferrules in an isolated manner.
Figure 6:
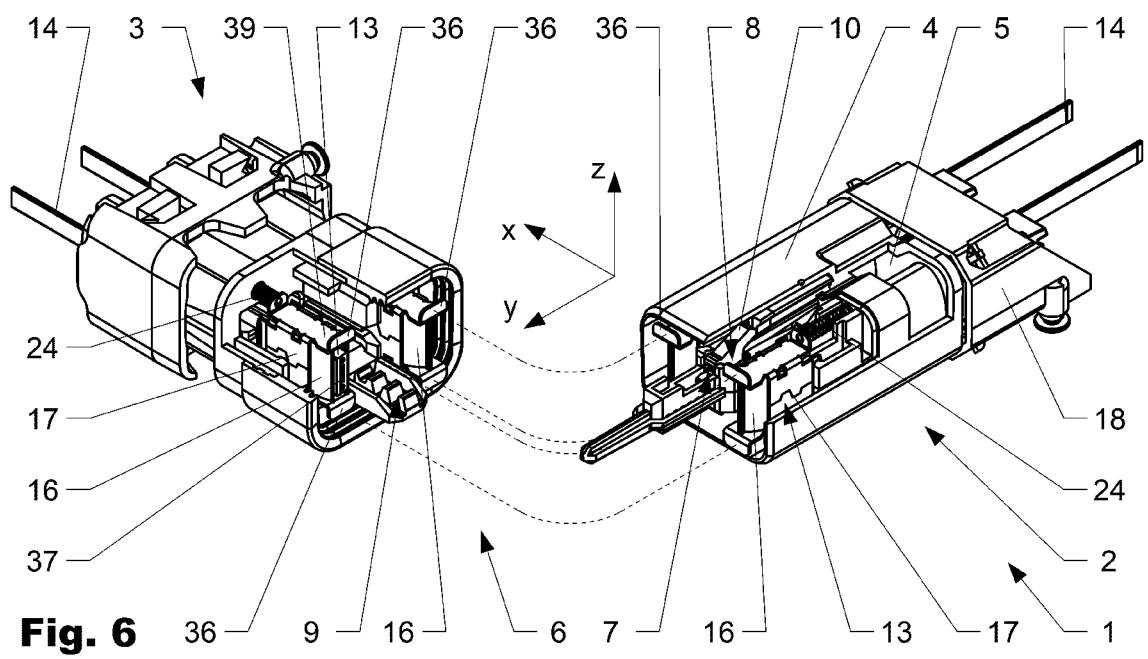
FIG. 6 shows a second embodiment of a connector assembly in a perspective manner from above and right.
Figure 7:
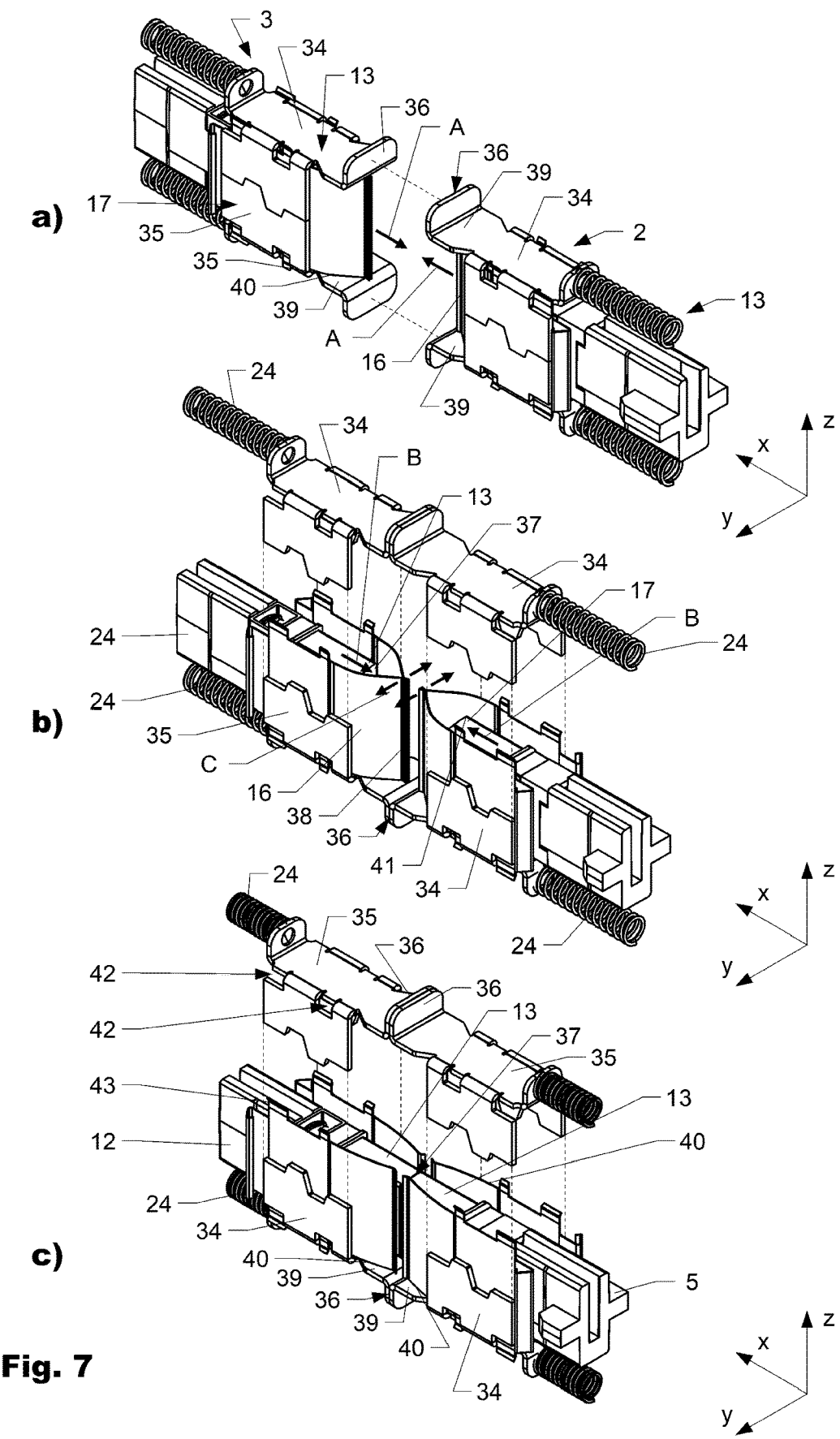
FIG. 7a shows a perspective view of a method of an interconnecting ferrule as the ferrules are displaced against each other.
FIG. 7b shows a perspective view of a method of an interconnecting ferrule as the ferrules are moved against each other.
FIG. 7c shows a perspective view of a method of an interconnecting ferrule after the ferrules are mated with each other.

FIG. 1 shows a connector assembly 1 in a perspective view from above and right in an uncoupled manner. FIG. 2 show the connector assembly 1 in a perspective view from above and left. FIG. 3 shows the connector assembly 1 in a top view. FIG. 4 shows the connector assembly 1 in a section view along section line DD of FIG. 3. FIG. 5 shows 2×2 ferrules 13 normally arranged inside and forming part of a variation of the connector assembly 1. FIG. 6 shows a second embodiment of a connector assembly 1. FIG. 7 schematically shows in three steps (a) through (c) how ferrules 13 of a first and a second connector part 2, 3 are interconnected to each other.

The connector assemblies 1 shown in FIGS. 1 through 4 and FIG. 6 comprise a first connector part 2 and a second connector part 3 suitable to be interconnected 5 (mated) to the first connector part 2 in a first direction x (mating direction). In the shown variations, the first and the second connector part 2, 3 are part of a board-to-board connector assembly 1 foreseen to interconnect a first board 21 and a second board 22 (see e.g. FIG. 1). The first and the second board 21, 22 are arranged at an angle of 90° with respect to each other. Other angles or parallel arrangements are possible. While the second board 22 and the thereon arranged second connector part 3 are arranged in a fixed manner, the first board 21 and thereon arranged first connector part 2 are arranged moveable for mating with the second connector part 3. An advantage of the connector assembly is that several connector assemblies 1 can be arranged next to each other due to compact design of shutter. This causes no difficulty due to the effective reduction of the forces necessary for mating the first and the second connector parts 1. As visible in FIG. 2, the housing 12 of the second connector part 3 comprises a connection tube 27, which is foreseen to introduce or extract air or an inert gas, etc. into the connector assembly or extract it from there. In the housing at least one filter 28, e.g. made from a porous material or pollution retracting material, can be arranged in at least one of the housings 4, 5, 12 which prevents unwanted pollution from entering into the sensitive inner area of the connector assembly 1. In the shown variation both connector parts 2, 3 each comprise a filter 28. The optical fibers 14 pierce through the filter 28 which is here made from foamed plastic. In the shown variation, the outer housing 4 of the first connector part 2 comprises on the outside a circumferential seal 29 which in the engaged position seals the outer housing 4 of the first connector part 2 with respect to the housing 12 of the second connector part 3. The first connector part 2 comprises an outer housing 4 and an inner housing 5, which at least during mating with the second connector part 3 is arranged translatable in the first direction with respect to the outer housing 4. A gear mechanism 6 which is best visible in FIG. 4 interconnects the first and the second connector part 2, 3 and influences the relative movement between the inner and the outer housing 4, 5 of the first connector part 2 in relation to the relative movement between the first connector part 2 and the second connector part 3 during mating.

As visible in FIG. 4 and FIG. 6 the first gear 7 is a gear wheel arranged rotatable about a gear axis 8 and the second gear 9 is a gear rod. The gear wheel 7 is arranged at the inner housing 5 of the first connector part 2 and the second gear 9 is arranged on the inside of a housing 12 of the second connector part 3. The outer housing 4 of the first connector part 2 is, at least during mating of the first and the second connector parts 2, 3, mechanically interconnected to the first gear 7. In the shown embodiment this is achieved by a lever 10 which interacts with a nose 20. The gear mechanism 6 can be, as here shown, loaded by a spring 11 which executes a reset force onto the gear mechanism 6. Thereby it is achieved that the gear mechanism 6 is in a defined position ready for mating with the second connector part 3.

The first connector part 2 is an optical connector and comprises a first pair of ferrules 13 on the inside arranged by a distance spaced apart from each other. Depending on the field of application other number of ferrules 13 are possible. If appropriate the connector can comprise alternatively or in addition electrical connecting means on the inside. The ferrules 13 are foreseen to encompass (terminate) at least one optical fiber 14. The ferrules 13, respectively the optical fibers encompassed therein extend in the mated position the first direction (x-direction). The ferrules 13 are each arranged displaceable with respect to the inner housing 5 in the first direction x against the force of a thereto related spring 15.

As visible in FIG. 5 and FIG. 7 which shows the Ferrules 13 of the first and the second connector part 2, 3 in an isolated manner. The ferrules 13 are protected by a shutter assembly as described hereinafter in more detail. The path of interconnection of the connector parts 2, 3 is schematically indicated by dotted lines. In FIG. 5 the ferrules 13 of the second connector part 3 are arranged at position of 90° with respect to mating. In FIG. 7, they are arranged in a line. Some parts are shown in a cut manner, such that the inside becomes better apparent. In FIG. 5 the two shutters 16 at the front are shown in an open (with respect to x-direction retracted position) such that the ferrules 13 arranged on the inside become visible.

Good results and a simple but yet space saving design is achieved by the shown shutter 16 which is arranged at a shutter frame 17. As among others visible in FIG. 7a through FIG. 7c and described in more detail hereinafter, the shutter 16 and the shutter frame 17 are arranged displaceable with respect to the ferrule 13 against the force of a spring 24. In the shown variation the shutter 16 comprises two resilient sheets 16 which extend in a closed position in front of the ferrule 13 enclosing the ferrule 13.

In FIG. 7a through FIG. 7c several steps of interconnecting a first and a second ferrule 13 along the first direction (x-direction) are schematically shown. Each of the ferrules 13 is encompassed by a shutter frame 17 to which a first and a second shutter 16 is arranged. The shutter frame 17 comprises in the shown embodiment an upper frame part 34 and a lower frame part 35 which are made from sheet metal and from a viewer's point of view are assembled in z-direction (schematically indicated by dotted lines). Compared to the shutter 16, the shutter frame 17 in the shown embodiment is designed more rigid and thereby less deformable. This can be achieved in that the material of the sheet metal is thicker than the sheet metal used for the shutter.

The shutter frames 17 and the thereto attached shutters 16 are arranged displaceable relative to the ferrule 13 such that while moving the shutter frames 17 and the shutters 16 in a rearward direction with respect to the front face (connection face 37) of the ferrules 13. The shutters 16 are moved apart from a closed (FIG. 7*a*) to an open position (FIG. 7*c*) in a lateral direction in that the ferrule 13 presses by an edge 41 against the inside of the curved shutter 16. This process is schematically shown in FIG. 7*a* through FIG. 7*c*.

In FIG. 7*a* the ferrules 13 and the shutter frames 17 with the shutters 6 surrounding the ferrules 13 are displaced against each other as indicated by opposite arrows A until at least one locating surface 36 arranged at each shutter frame 17 interacts with an opposite locating surface 36 of an opposite shutter frame 17. When the contact between the shutter frames 17 via the locating surfaces 36 is established, the ferrules 13 are moved further against each other as schematically indicated in FIG. 7*b* by arrows B. As a result thereof the shutters 16 which are preferably made from an elastically deformable material, such as thin sheet metal, e.g. spring steel, are forced apart in a lateral direction as indicated by arrows C such that dedicated front faces 37 of the ferrules 13 can mate with each other as schematically indicated by FIG. 7*c*. In the shown variation the shutters are deformed in a resilient manner when forces apart. Alternatively or in addition the shutters 16 can be arranged in a hinged manner and if necessary spring loaded.

The connector assembly 1 according to a variation of the invention comprises a first connector part 2, which is interconnectable to a second connector part 3. The first connector part 2 comprises a ferrule 13 which is encompassed by a shutter frame 17 and at least one thereto attached shutter 16 which is arranged movable with respect to the ferrule 13 in a first direction x between a closed position, in which the at least one shutter 16 encompasses a connection face 37 of the ferrule 13, and an open position, in which the connection face 37 is set free from the at least one shutter 16. The shutter frame 17 and/or the at least one shutter 16 may comprise at least one locating surface 36 which during mating interacts with the second connector part 3, e.g. in that the second connector part comprises a locating surface similar to the locating surface of the first connector part. Thereby the at least one shutter 16 is displaced relative to the ferrule 13 in the first direction from the closed to the open position. Superimposed to the movement in the first direction the shutter 16, due to interaction with the ferrule 13, swivels sideways thereby releasing the connection face 37. Good results can be achieved when the shutter 16 comprises at least one resilient sheet 16, which is attached to the shutter frame 17. In the closed position as shown in FIG. 7*a* the resilient sheet 16 extends in front of the connection face 37 of the ferrule 13 and thereby protects the sensitive areas from negative outside influences. A continuous course of the forces necessary to connect the first and the second connector parts can be achieved when the resilient sheet 16 extends in a continuously curved manner in front of the connection face. As shown in the present variation the shutter 16 may comprise two resilient sheets 16 which in a closed position interact with each other along a sealing edge 38 in a prestressed manner. The shutter frame 17 and/or the shutter 16 can be arranged displaceable with respect to the ferrule 9 in the first direction x against the force of a spring 24, which supports reclosing of the shutter assembly (shutter frame 17 and shutter 16). The shutter frame 17 may comprise at least one rim 39 extending parallel along a side edge 40 of the shutter 16. In that during operation only a small gap exists between the side edge 40 and the rim 39 such that entry of dust from the outside can be prevented effectively. At the end the rim 39 merges into locating surface 36. As schematically shown in FIG. 7*c* the locating surface 36 is during interconnection foreseen to interact directly or indirectly with the second connector part 3, i.e. in the shown variation having a symmetric setup, a second location surface 36. Thereby the shutter frame 17 and the thereto interconnected shutter 16 are pushed in a rearward direction with respect to the ferrule 13 thereby releasing the connection face 37. An advantage is that the interaction between two opposite shutter frames 17 in the described manner can effectively prevent of dust from the outside as the direct interaction can work as a seal.

The shutter frame 17 comprises an upper and a lower part 34, 35 which have a symmetric setup. The upper and the lower part 34, 35 comprise at least one opening 42 which is foreseen to cooperate with at least one snap finger 43 arranged at the resilient sheet of the shutter 16. Thereby the shutter frame 17 and the resilient sheets 16 of the shutter 16 can be easily assembled by snap fit.

When interconnecting a first and a second connector part 2, 3 of a connector assembly 1 the first connector part 2 is aligned a second connector part 3 with respect to the first direction x. Then the first and the second connector part 2, 3 are displaced relative to each other until the locating surface 36 which is interconnected to the shutter 16 interacts with a corresponding part 36 of the second connector part 3 (FIG. 7*b*). Then by continuous movement, the shutter 16 is displaced relative to the ferrule 13 from the closed position to the open position (FIG. 7*c*). As a result, the shutter frame 17 is moved along the ferrule 13 in the first direction x the elastic sheets 16 of the shutter 16 are deformed in an outward direction due to interaction with an edge 41 of the ferrule 13.

The invention claimed is:

1. A connector assembly (1) comprising:
   a. a first connector part (2) which is interconnectable to a second connector part (3), said first connector part (2) comprising
   b. a ferrule (13) which is encompassed by a shutter frame (17) and at least one thereto attached shutter (16) which is arranged movable with respect to the ferrule (13) in a first direction (x) between
      i. a closed position in which the at least one shutter (16) encompasses a connection face (37) of the ferrule (13) and
      ii. an open position in which the connection face (37) is set free from the at least one shutter (16), wherein
   c. the shutter frame (17) and/or the at least one shutter (16) comprises at least one locating surface (36) which during mating interacts with the second connector part (3) such that the at least one shutter (16) is displaced relative to the ferrule (13) from the closed to the open position, wherein the interaction between the locating surface (36) and the second connector part (3) is a frontal interaction, wherein the frontal interaction is along the first direction (x),
   d. wherein a sealing means is arranged in the area of the locating surface (36) of at least one connector part (2, 3), which during interaction of a first and a second connector part (2, 3) seals the ferrules (13) with respect to the environment, and e. wherein the shutter (16) releases the connection face (37) after the sealing means engages between the first and the second connector parts (2, 3).

2. The connector assembly (1) according to claim 1, wherein the ferrule (13) encompasses at least one optical fiber (14).

3. The connector assembly (1) according to claim 1, wherein the shutter (16) comprises at least one resilient sheet (16), which is attached to the shutter frame (17) and which extends in the closed position in front of the connection face (37) of the ferrule (13).

4. The connector assembly (1) according to claim 3, wherein the resilient sheet (16) extends in a continuously curved manner in front of the connection face (37).

5. The connector assembly (1) according to claim 3, wherein the shutter (16) comprises two resilient sheets (16) which in a closed position interact with each other along a sealing edge (38) in a prestressed manner.

6. The connector assembly (1) according to claim 1, wherein the shutter frame (17) and/or the shutter (16) are arranged displaceable with respect to the ferrule (9) in the first direction (x) against the force of a spring (24).

7. The connector assembly (1) according to claim 1, wherein the shutter frame (17) comprises at least one rim (39) extending along a side edge (40) of the shutter (16).

8. The connector assembly (1) according to claim 7, wherein the rim (39) merges into a locating surface (36).

9. The connector assembly (1) according to claim 1, wherein the shutter frame (17) comprises an upper part and a lower part (34, 35) which have a symmetric setup.

10. The connector assembly (1) according to claim 1, wherein the second connector part (3) comprises a shutter (16) and a shutter frame (17) similar to the first connector part (2).

11. The connector assembly (1) according to claim 1, wherein at least one of the connectors parts (2, 3) comprises an inner housing (5) to which a ferrule (13) is interconnected and which during mating with the second connector part (3) is arranged translatable in the first direction (x) with respect to the outer housing (4).

12. The connector assembly (1) according to claim 1, wherein shutter (16) and/or the shutter frame (17) are made from and/or coated by electrical conductive material.

13. The connector assembly (1) according to claim 12, wherein the shutter (16) and/or the shutter frame (17) made from and/or coated by electrical conductive material are used for transmission of a signal and/or electrical power.

14. The first connector part (2) is suitable to be used in a connector assembly according to claim 1.

15. The second connector part (3) is suitable to be used in a connector assembly according to claim 1.

* * * * *